US00RE49177E

(19) United States
(12) Reissued Patent
Chudy

(10) Patent Number: US RE49,177 E
(45) Date of Reissued Patent: Aug. 23, 2022

(54) GOLF TEE

(71) Applicant: Martini Golf Tees, Inc., Waterford, MI (US)

(72) Inventor: Dean Chudy, Libertyville, IL (US)

(73) Assignee: Martini Golf Tees, Inc., Waterford, MI (US)

(21) Appl. No.: 29/798,004

(22) Filed: Aug. 23, 2021

Related U.S. Patent Documents

Reissue of:
(64) Patent No.: Des. 885,500
Issued: May 26, 2020
Appl. No.: 29/682,442
Filed: Mar. 5, 2019

(51) LOC (13) Cl. ..... 21-02
(52) U.S. Cl.
USPC ..... D21/718
(58) Field of Classification Search
USPC ..... D21/717, 718, 719
CPC ..... A63B 57/10; A63B 57/12; A63B 57/13; A63B 57/15; A63B 57/16; A63B 57/19; A63B 57/20
See application file for complete search history.

(56) References Cited

U.S. PATENT DOCUMENTS 1,588,815 A * 6/1926 Sillcocks ..... A63B 57/10 473/400
1,638,448 A * 8/1927 Manson ..... A63B 57/10 473/394
1,730,046 A * 10/1929 Stow ..... A63B 57/18 473/391
D91,149 S * 12/1933 Thomas ..... D21/718
3,559,998 A * 2/1971 Kelly ..... A63B 57/10 473/396
3,633,919 A * 1/1972 Liccardello ..... A63B 57/0037 473/386
4,786,054 A * 11/1988 Keys ..... A63B 57/12 473/268
5,356,146 A * 10/1994 Blosser ..... A63B 57/15 473/400
D430,913 S * 9/2000 Lovelace ..... D21/718
D442,243 S * 5/2001 Cutino ..... D21/717
D485,591 S * 1/2004 Bonfanti ..... D21/718
D539,368 S * 3/2007 Choo ..... D21/718
D555,218 S * 11/2007 Lee ..... D21/718
D635,423 S * 4/2011 Prickett ..... D8/34
7,959,525 B1 * 6/2011 Brown ..... A63B 57/13 473/387
D729,328 S * 5/2015 Romley ..... D21/718
(Continued)

FOREIGN PATENT DOCUMENTS

GB 249639 A * 4/1926 ..... A63B 57/10
GB 427478 A * 4/1935 ..... A63B 57/10
(Continued)

*Primary Examiner* — Philip S Hyder
(74) *Attorney, Agent, or Firm* — Law Offices John G. Posa

(57) CLAIM

The ornamental design for a golf tee, as shown and described.

DESCRIPTION

FIG. 1 is a front perspective view of a golf tee embodying my new design;
FIG. 2 is a top front, perspective view thereof;
FIG. 3 is a top plan view thereof;
FIG. 4 is a bottom plan view thereof; and,
FIG. 5 is a side view thereof, the other side view, as well as front and rear views being identical thereto.
The broken lines form no part of the claimed design.

1 Claim, 3 Drawing Sheets

Figure 3:
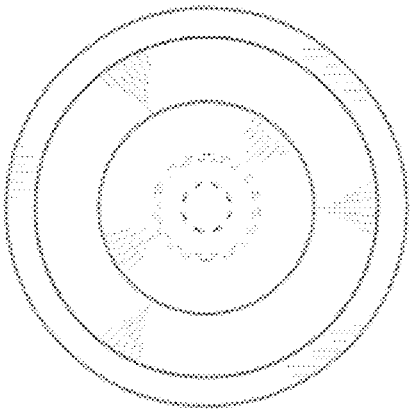
Figure 4:
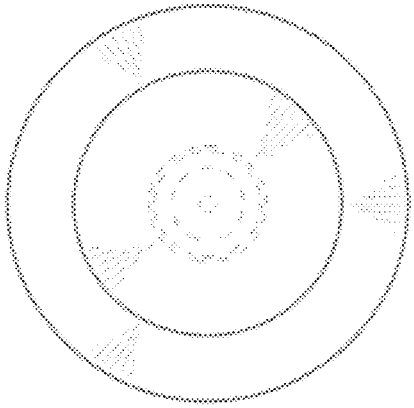

Matter enclosed in heavy brackets [ ] appears in the original patent but forms no part of this reissue; matter printed in italics indicates the additions made by reissue.

(AMENDED)

(56) References Cited

U.S. PATENT DOCUMENTS

| | | | | | |
|---|---|---|---|---|---|
| D772,993 | S * | 11/2016 | Stover | D21/718 | |
| 2005/0215356 | A1* | 9/2005 | Bainbridge | A63B 57/10 | 473/396 |
| 2006/0009312 | A1* | 1/2006 | Chotos | A63B 57/10 | 473/387 |
| 2008/0287219 | A1* | 11/2008 | Gyorgyi | A63B 57/0032 | 473/386 |
| 2012/0077625 | A1* | 3/2012 | Passero | A63B 57/10 | 473/401 |

FOREIGN PATENT DOCUMENTS

| | | | | |
|---|---|---|---|---|
| GB | 428574 | A * | 5/1935 | A63B 57/10 |
| WO | WO-2005037380 | A1 * | 4/2005 | A63B 57/15 |
| WO | WO-2007083880 | A1 * | 7/2007 | A63B 57/10 |
| WO | WO-2008088366 | A2 * | 7/2008 | A63B 57/10 |

* cited by examiner

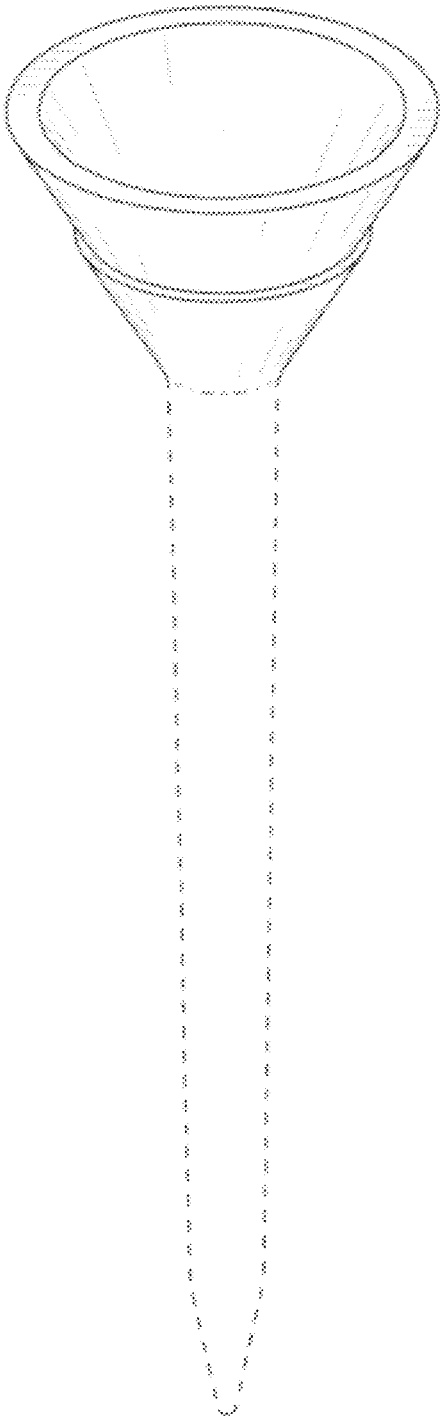
FIG. 1
(AMENDED)

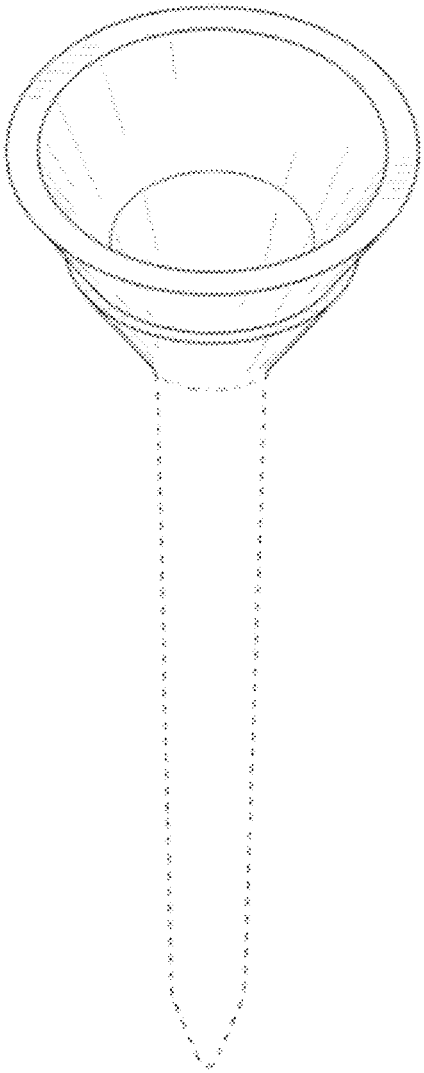
FIG. 2
(AMENDED)

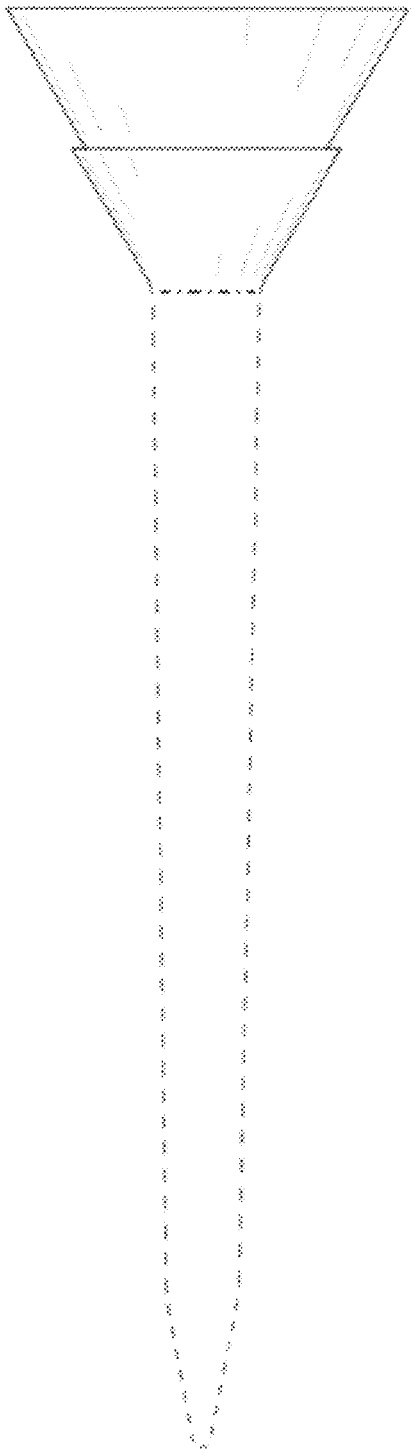
FIG. 5
(AMENDED)